Figure 11:
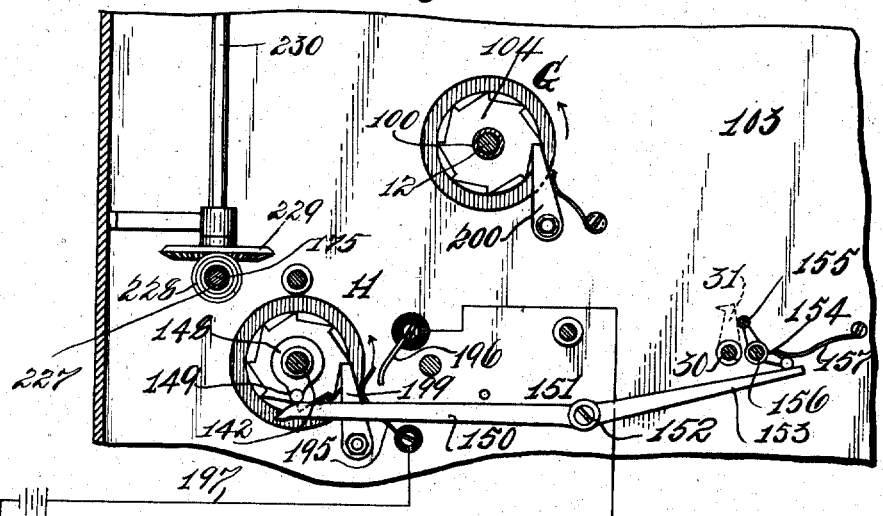

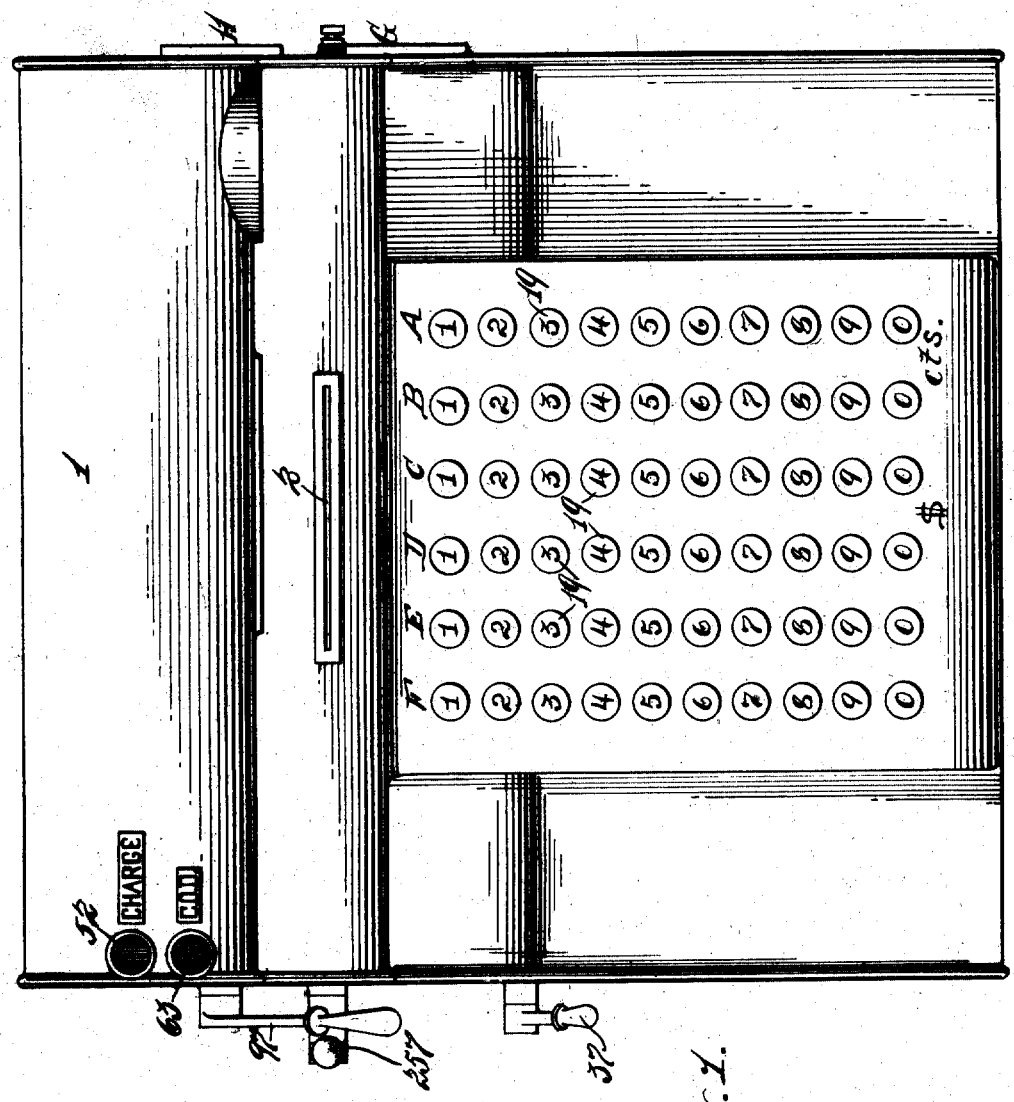

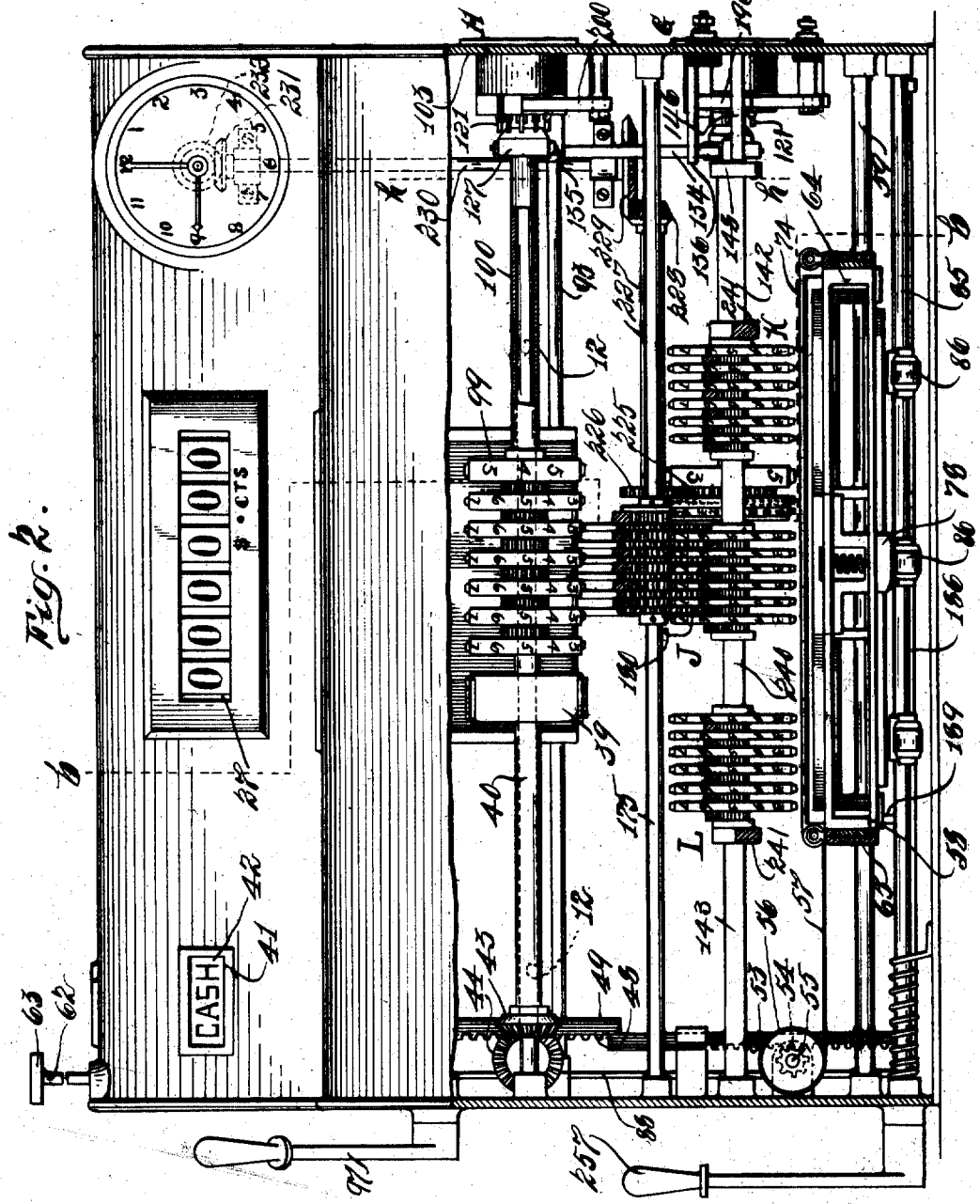

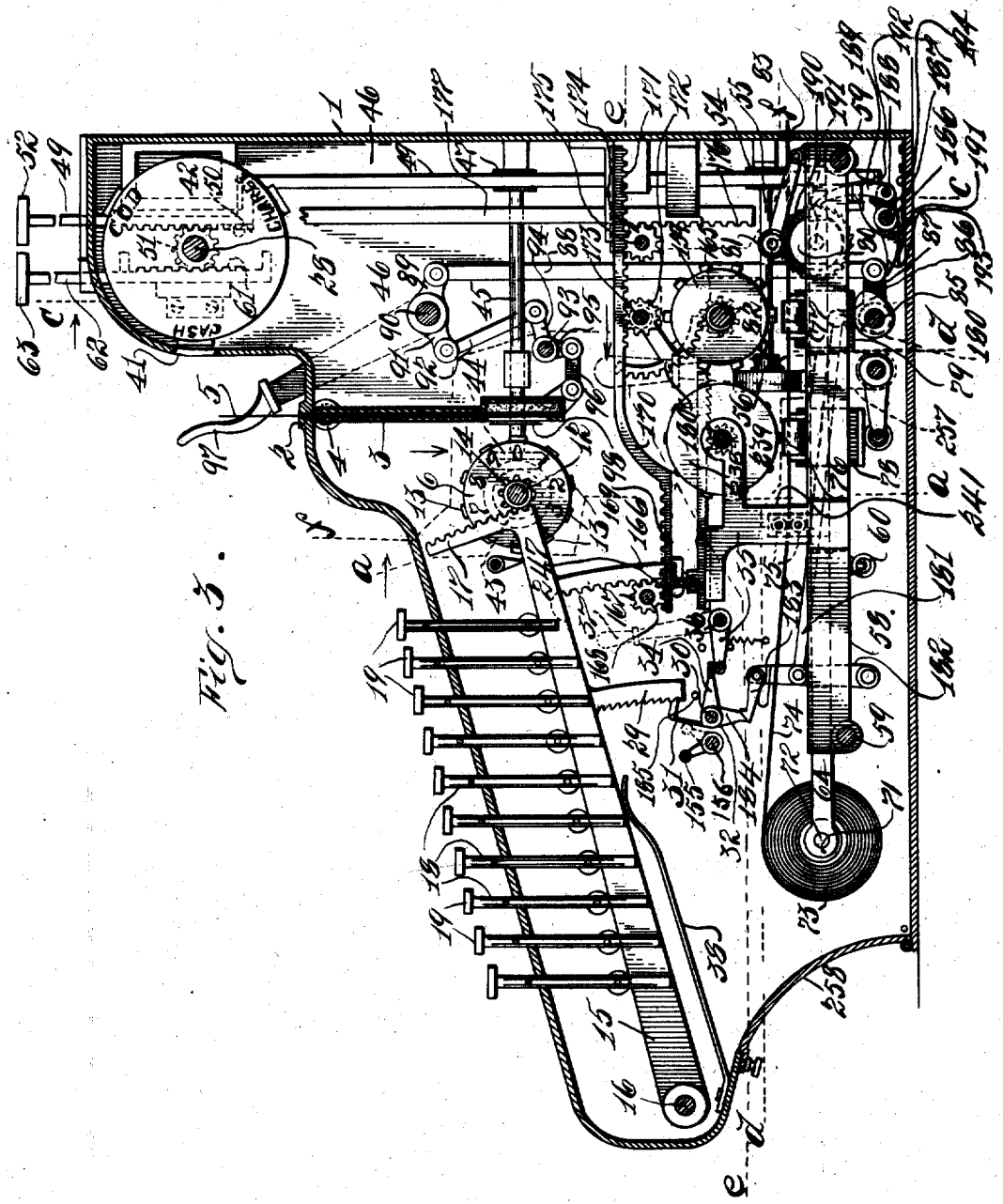

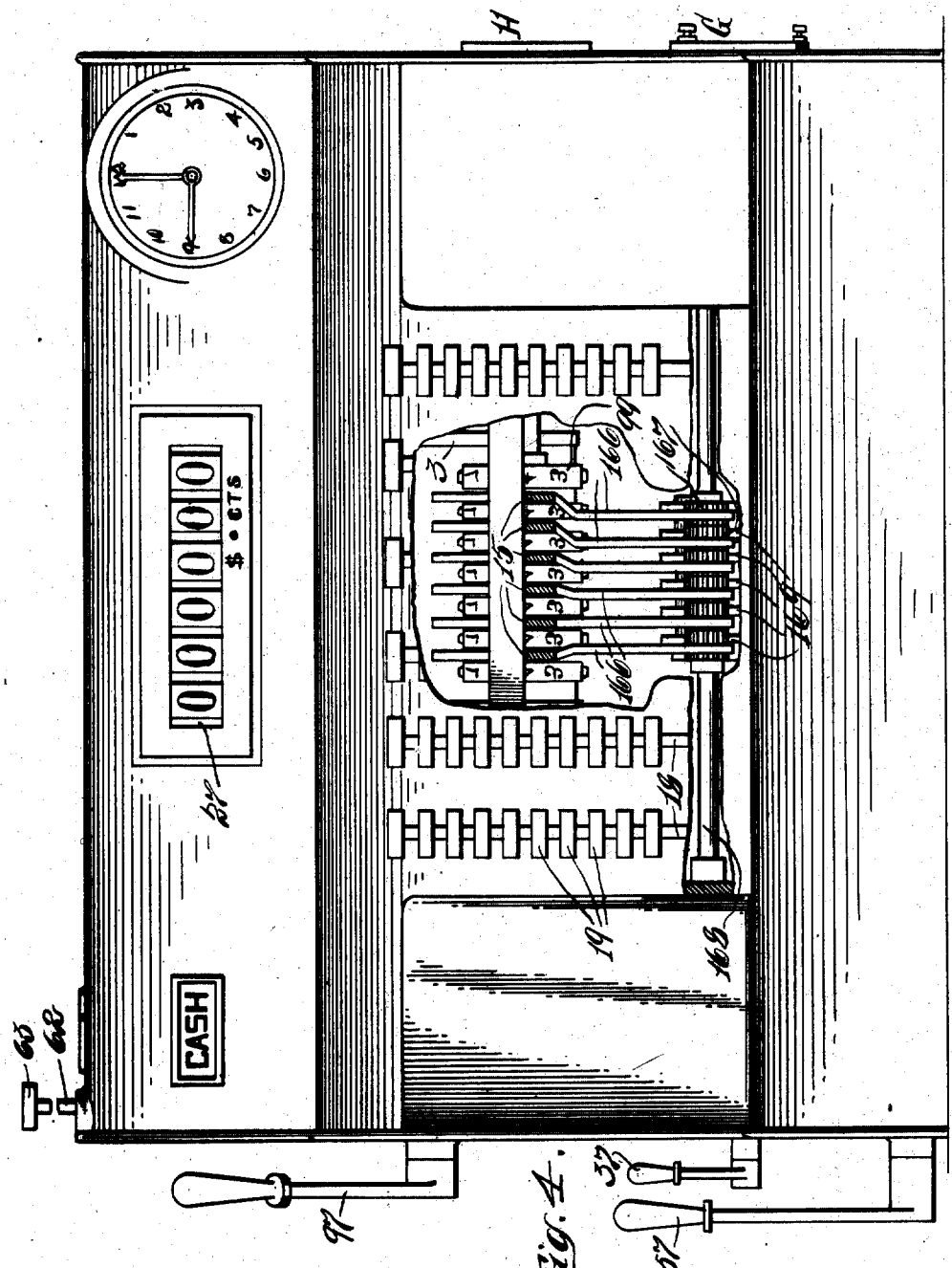

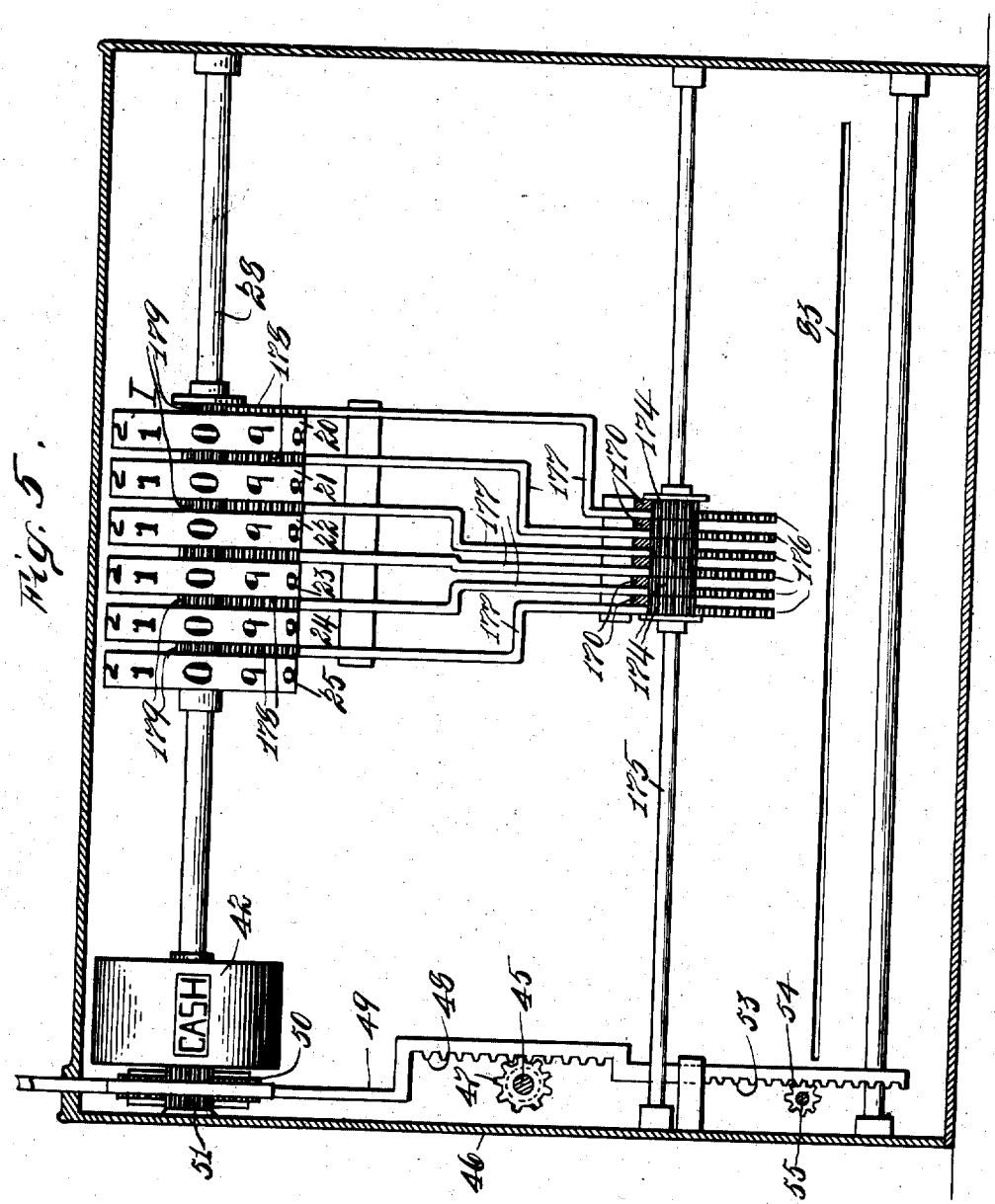

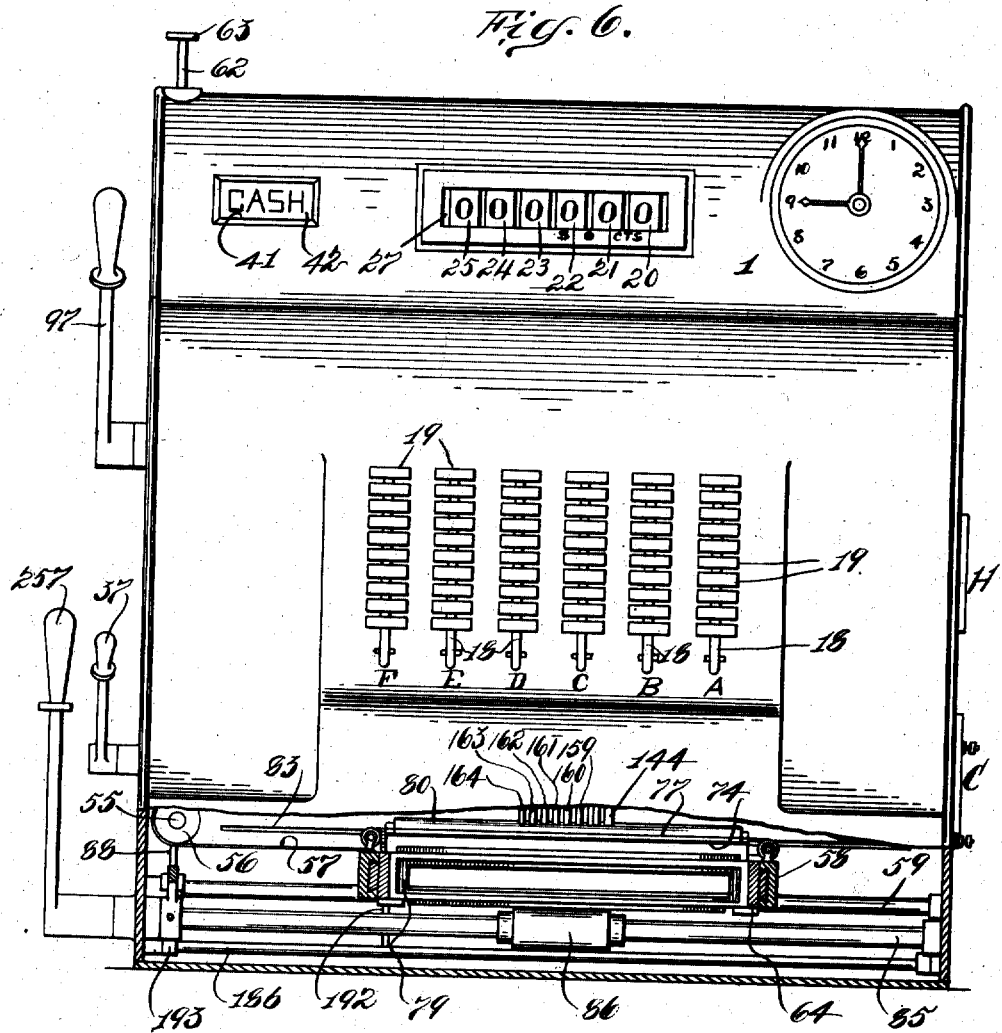

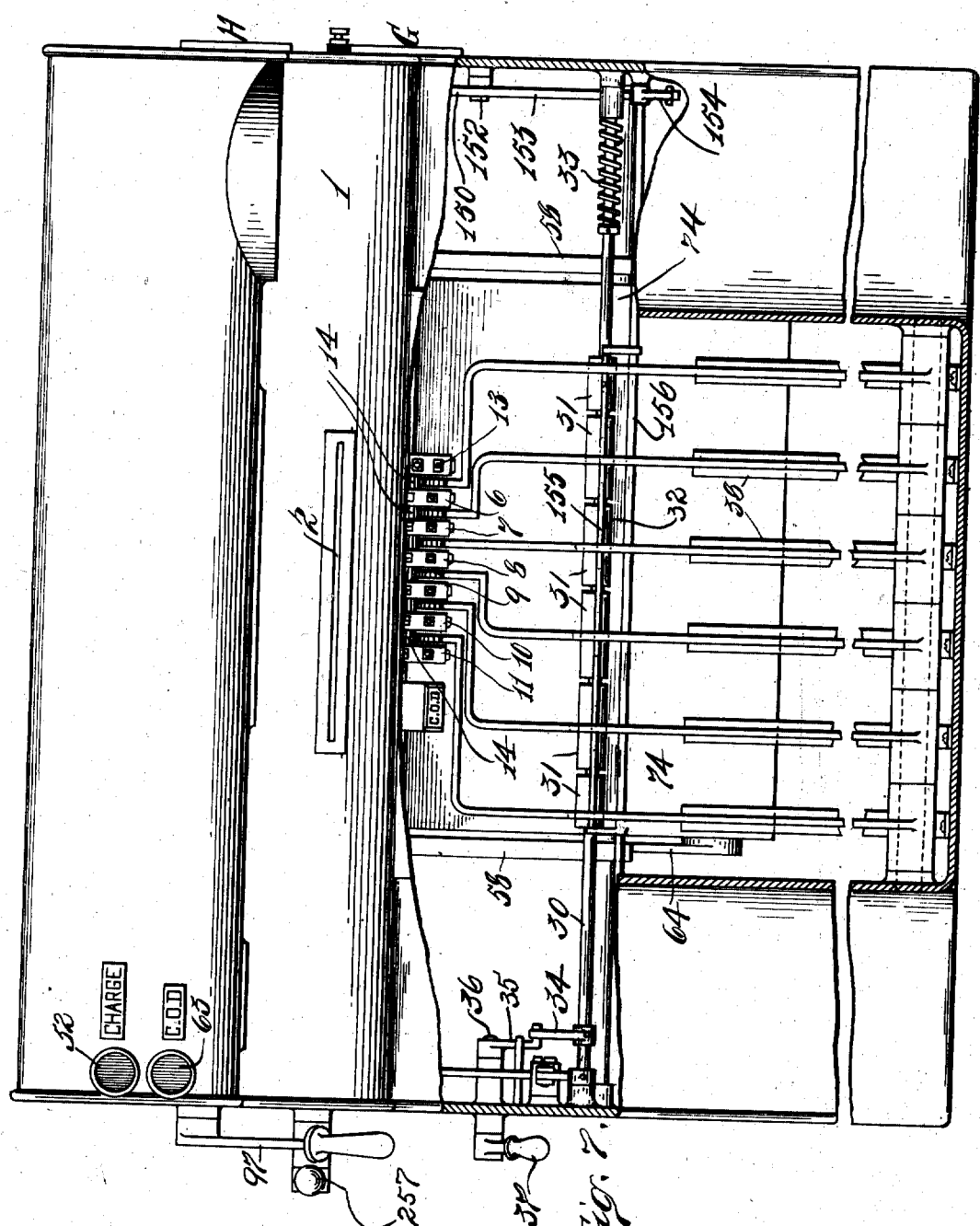

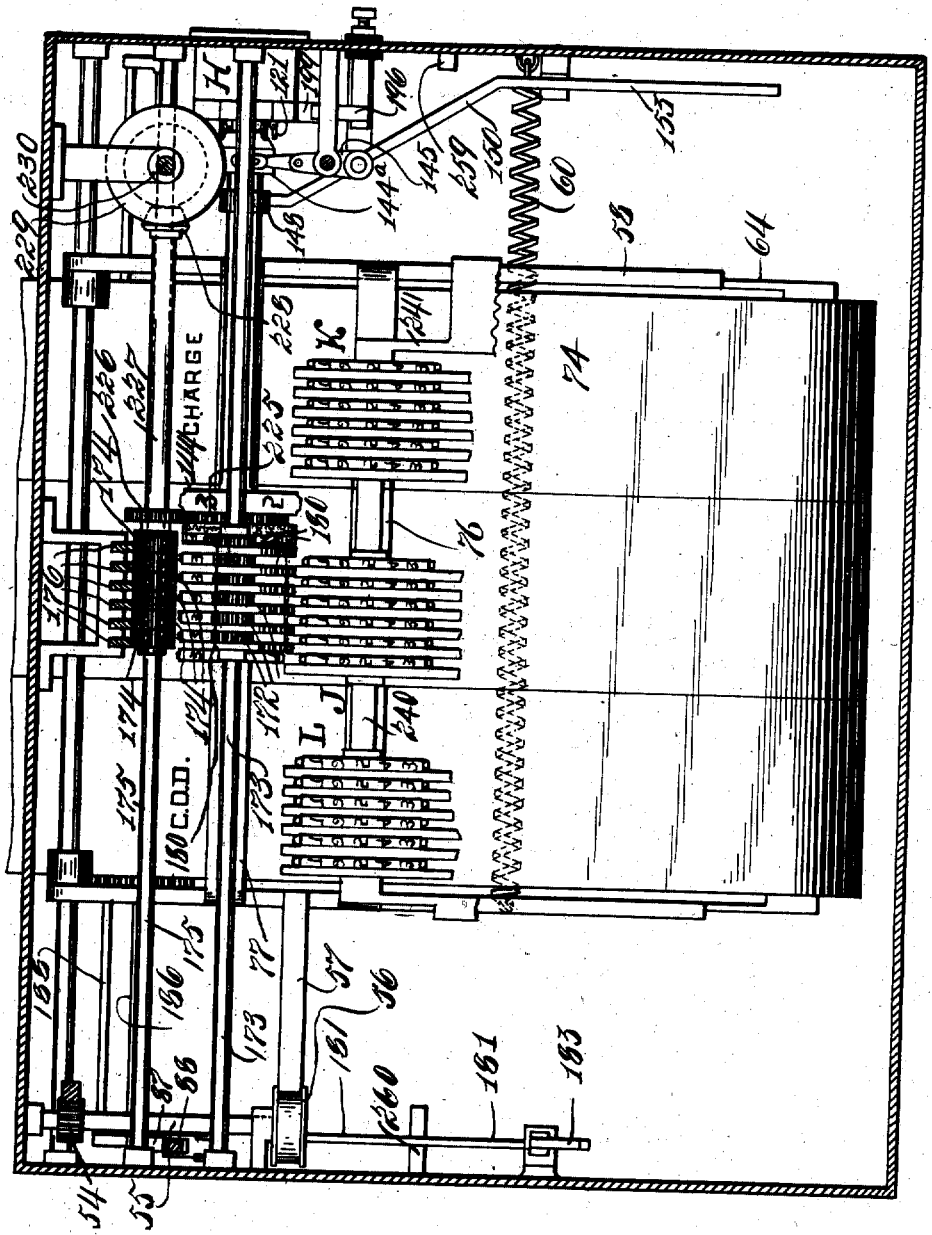

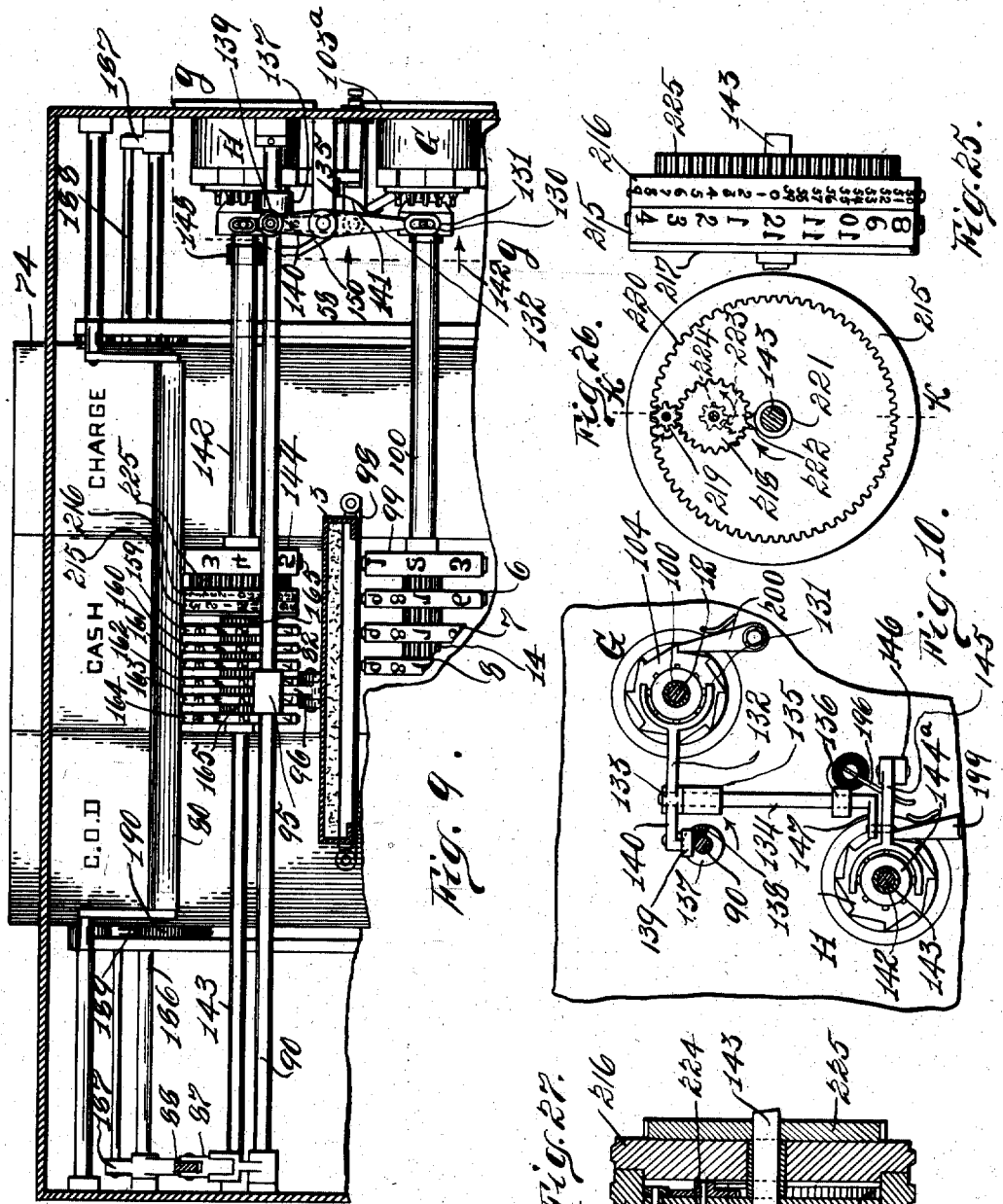

I. FLUEGELMAN.
AUDITING CASH REGISTER.
APPLICATION FILED JUNE 1, 1908. RENEWED APR. 4, 1911.

994,735.

Patented June 13, 1911.
13 SHEETS—SHEET 10.

Witnesses:
C. A. Jarvis
Mildred Vialls

Inventor
Isidor Fluegelman.
By
Attorney

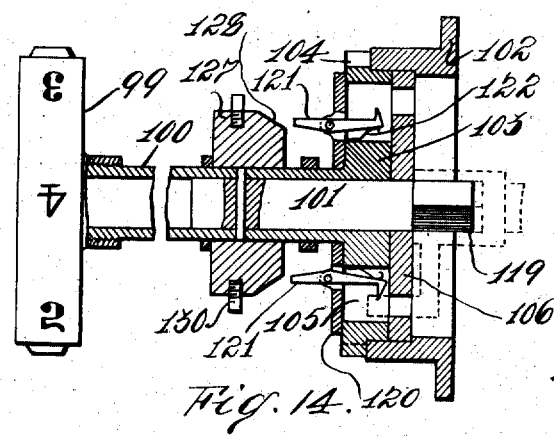
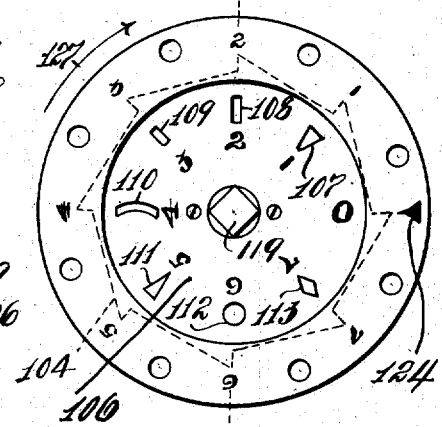
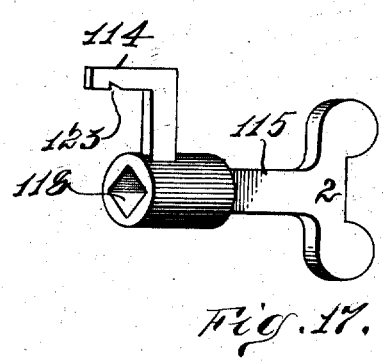
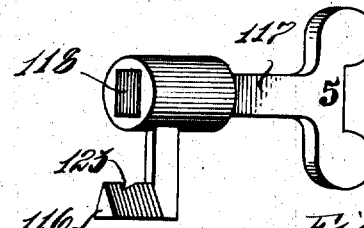
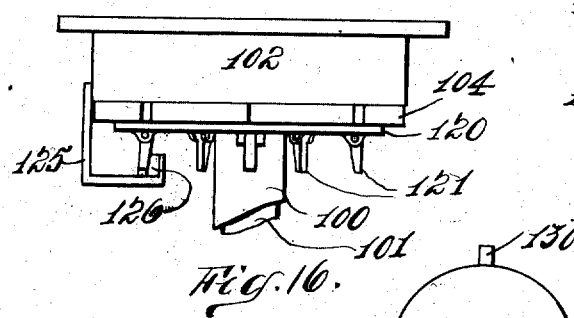
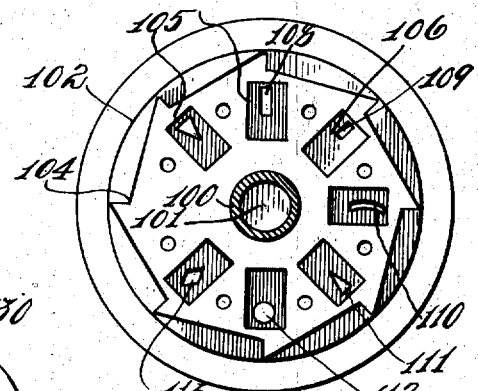
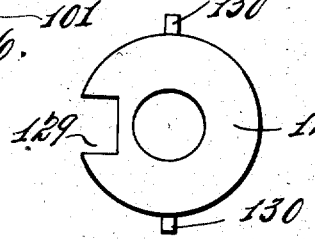

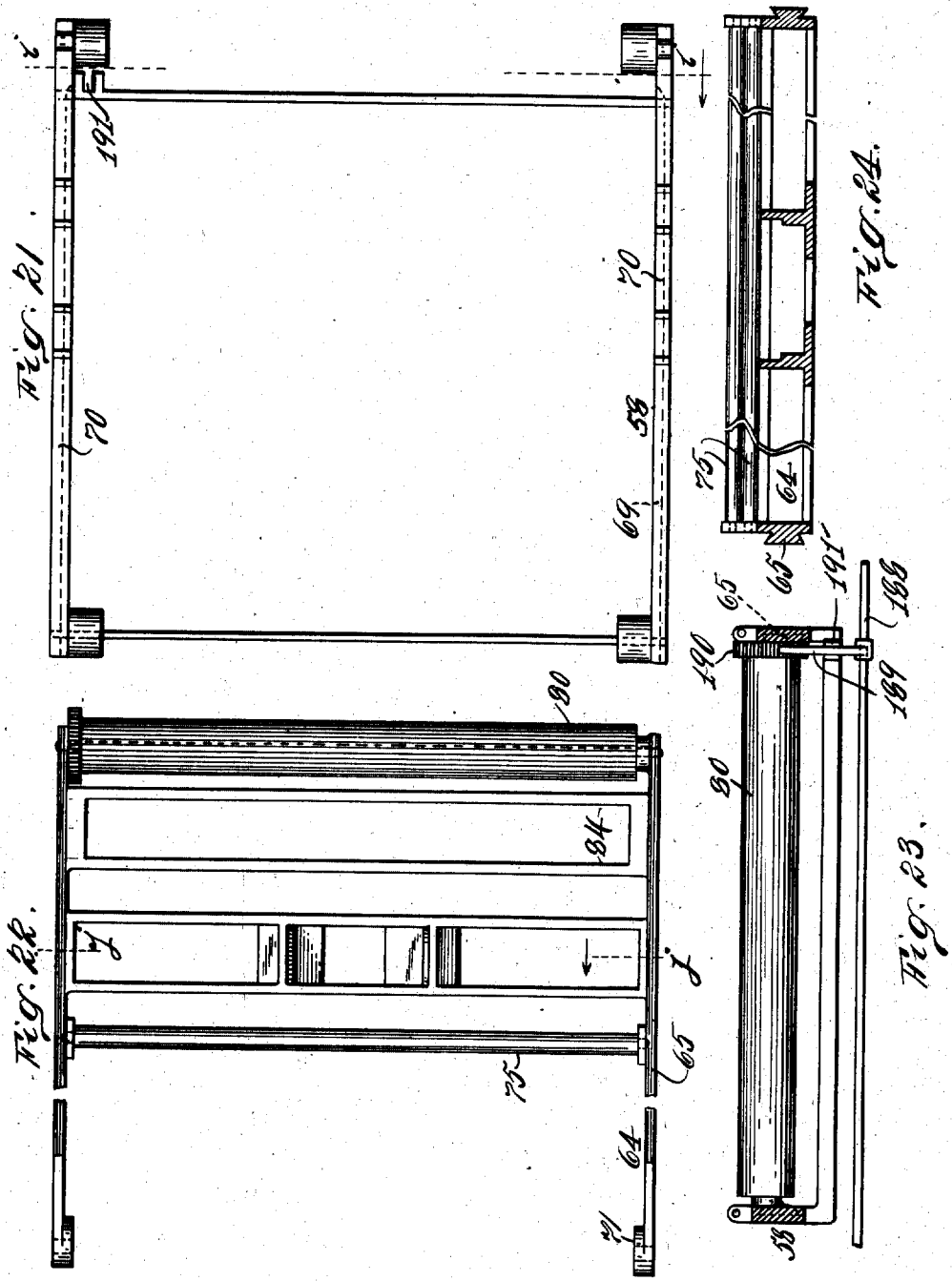

I. FLUEGELMAN.
AUDITING CASH REGISTER.
APPLICATION FILED JUNE 1, 1908. RENEWED APR. 4, 1911.
994,735.
Patented June 13, 1911.
13 SHEETS—SHEET 13.
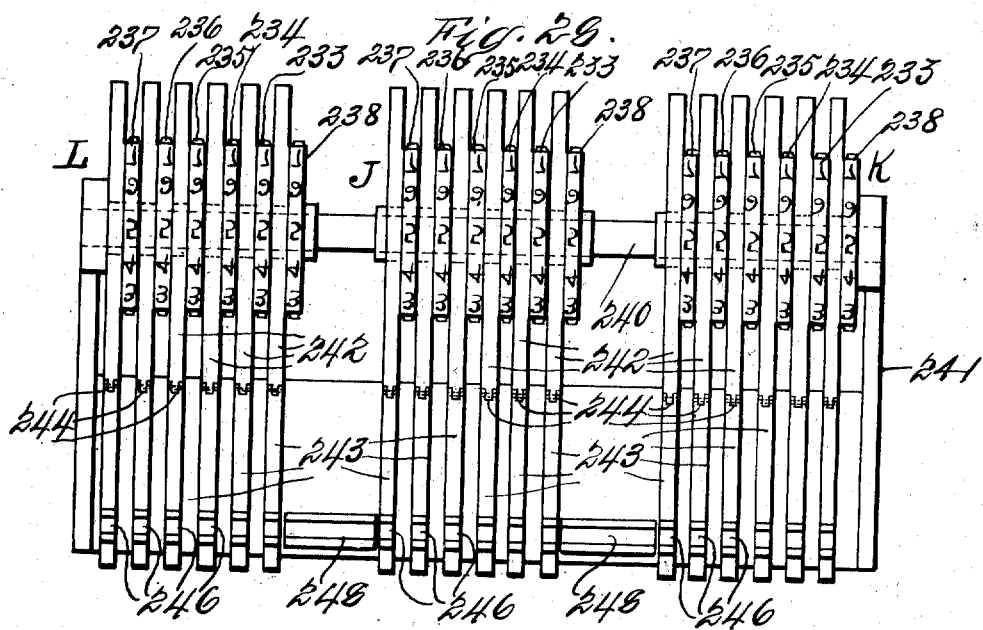
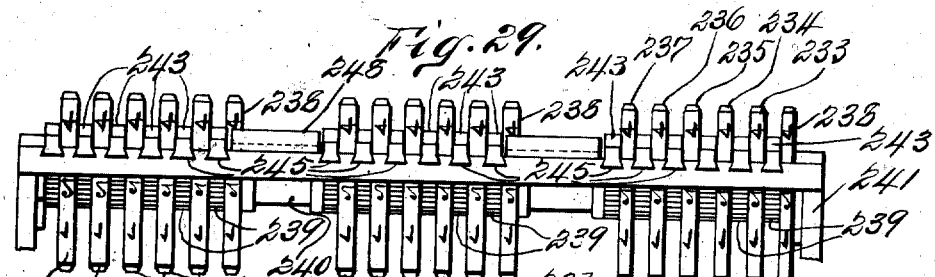
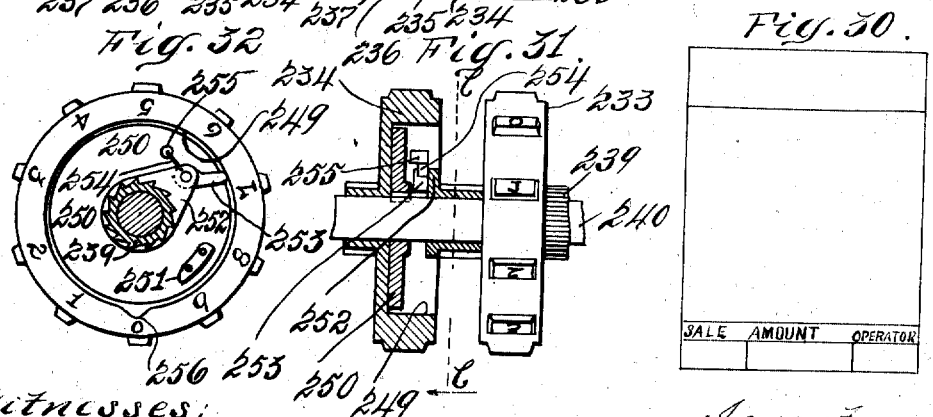
Witnesses:
C. A. Jarvis
Mildred Vialls
Inventor:
Isidor Fluegelman
By Maurice Bloch
Attorney.

UNITED STATES PATENT OFFICE.

ISIDOR FLUEGELMAN, OF NEW YORK, N. Y.

AUDITING CASH-REGISTER.

994,735.  Specification of Letters Patent.  Patented June 13, 1911.

Application filed June 1, 1908, Serial No. 436,035. Renewed April 4, 1911. Serial No. 618,921.

*To all whom it may concern:*

Be it known that I, ISIDOR FLUEGELMAN, a citizen of the United States, residing at New York city, Manhattan borough, county and State of New York, have invented certain new and useful Improvements in Auditing Cash-Registers, of which the following is a clear, full, and exact description.

This invention relates to cash-registers.

The object of providing a cash-register of the character comprising my invention is to facilitate the auditing of the accounts of enterprises which issue a check, or ticket, with every sale of goods made. As department stores are probably the most well-known enterprises which issue checks with every sale, I have embodied the features, which form my invention, in a cash-register for this purpose.

My improved cash-register differs from the ordinary cash-register in the respect that it is adapted to receive an individual check or ticket, commonly known as sales-tickets, and to record upon said sales ticket the amount of a sale, the character of the sale, whether it be a cash sale, a charge sale, or a cash-on-delivery sale, and the identifying character of the operator or cashier. My improved cash-register is also adapted to record on a record sheet the amount of the sale, the character of the sale, the time of the sale and the identifying character of the operator all of which, excepting the time record, will correspond to the record on the sales ticket.

A further object of my invention is to provide an auxiliary tell-tale, which will be placed in the office of the manager, or in any other desirable place, adapted to indicate the identifying character of the operator on duty, if any, and to indicate when the cash-register, to which it may be attached, is locked or unlocked for operation. It is my invention to adapt my improved cash-register for locking when an operator goes off duty, and to remain locked until another operator, or the same operator, goes on duty.

To check the sales made, that is, to indicate what sales were made by any particular operator, I connect the locking mechanism and the operator's identifying character recording device for simultaneous operation, so that in order to unlock the mechanism for operation the operator must bring his or her identifying character in operative relationship with the sales ticket and record sheet, the locking mechanism being adapted for operation by a plurality of different keys, for instance. In order that a number of different operators can manipulate the device, I provide each of said operators with a key, which is adapted to enter the lock-controlling mechanism at a certain point, the said point being the only place that that particular key will enter. In order to unlock the mechanism the lock must be turned to a certain other point which will bring the identifying character of the operator in a position for recording, the keys carried by the other operators each having a certain point at which they will enter the lock-controlling mechanism.

The record sheet which I employ will keep a day's sales for instance, whether cash, charge or cash-on-delivery in separate columns which can be totalized at the end of the day, or at any time during the day, there being a totalizer for each column.

Other features as well as a more detailed description of the features already pointed out, will hereinafter appear.

To these and other ends which will hereinafter appear, my invention comprises the novel features of improvement and combination and arrangement of parts, which I will now proceed to describe and finally claim, reference being had to the accompanying drawing, forming part hereof, wherein—

Figure 12:
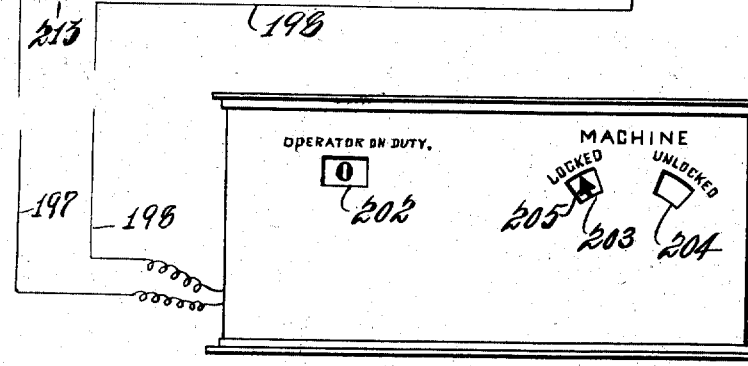
Figure 13:
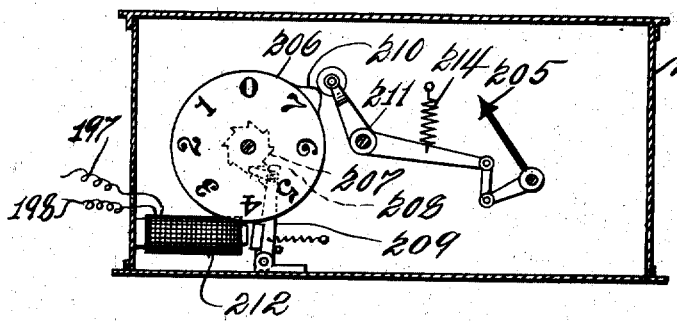

Figure 1 is a top plan view of my improved cash-register, showing the key-board thereof, the slot into which the sales ticket in inserted, and the charge and cash-on-delivery push buttons; Fig. 2 is an enlarged vertical sectional view, taken on a line $a$—$a$ in Fig. 3, looking in the direction of the arrow, showing the record sheet carrying carriage, the recording devices for the sales ticket, the totalizers, and a portion of the carriage operating device; Fig. 3 is a vertical sectional longitudinal view, taken on a line $b$—$b$ in Fig. 2, and shows the means for operating the sales ticket recording device, the record sheet recording device, the totalizers, the printing device, and other features to be hereinafter referred to; Fig. 4 is a face view of my improved cash-register, looking in the direction of the arrow in Fig. 3, the key-board being broken away to show more particularly the means which transmits movement, from the operating levers to the record sheet recording device; Fig. 5 is a vertical sectional view, taken on a line c—c in Fig. 3, and shows the manner of operating the record sheet carriage to correspond to the visible indicator, which carries the sales characterizations, and also the manner of operating the visible indicator. Fig. 6 is a face view of my cash-register, partly in section, the section being taken on a line d—d in Fig. 3, showing the manner of operating the printing pad for recording the amount of a sale on the record sheet. Fig. 7 is a top plan view of my cash-register, the finger-board thereof being broken away to show the operating levers for the sales ticket recording devices, the manner of operatively connecting said levers and said devices, and the locking mechanism for said levers; Fig. 8 is a sectional plan view, taken on a line e—e in Fig. 3, to show particularly the manner of operating the totalizers. Fig. 9 is a fragmentary sectional plan view, taken on a line f—f in Fig. 3, showing the record sheet in its normal position, the operating device for the pivotally mounted sales ticket receiver, and the devices connected therewith, which unlock the key-retaining device in the lock-controlling mechanism; Fig. 10 is a sectional fragmentary elevation, of the right hand wall of the cash-register casing, the section being taken on a line g—g in Fig. 9, showing the connection between the sleeves which carry the operator's identifying character recording devices and the lock controlling mechanism. Fig. 11 is a sectional fragmentary elevation of the left wall of the casing of the cash-register, the section being taken on a line h—h in Fig. 2, showing the mechanism for locking the operating levers for the sales ticket recording devices, the manner of operating the mechanism by the controlling device therefor, the electrical connection between the lower operator's identifying character controlling lock, and a portion of the time recording device; Fig. 12 is a face view of the tell-tale to be placed in the manager's office; Fig. 13 is a vertical sectional view thereof, and shows the magnetically controlled tell-tale device; Fig. 14 is an enlarged vertical central longitudinal sectional view of the operator's identifying character recording device, the disk being shown in elevation; Fig. 15 is a face view of the controlling mechanism therefor; Fig. 16 is a top plan view of the controlling mechanism only; Figs. 17 and 18 are perspective views of two different keys, each being adapted to operate the controlling mechanism of the operator's identifying character recording device; Fig. 19 is a rear elevation of the ratchet and bushing of the operator's identifying character recording device; Fig. 20 is a view, in rear elevation, of the cam which is adapted to unlock the key retaining device at the proper time; Fig. 21 is a detail plan view of the record sheet carrying carriage;

Fig. 22 is a detail plan view of the slide which carries the record sheet, the said slide being adapted to be removably supported by the carriage; Fig. 23 is an end view, in cross-section, (the section being taken on a line i—i in Fig. 21) of the carriage, the slide being shown in position, the pawl which operates the ratchet wheel, and the operating rod therefor being also shown; Fig. 24 is a sectional end view of the slide, the section being taken on a line j—j in Fig. 22; Fig. 25 is an enlarged detail view, in elevation, of the time recording disks; Fig. 26 is a view, in elevation, looking from the left in Fig. 25; Fig. 27 is a vertical sectional view, taken on a line k—k in Fig. 26; Fig. 28 is an enlarged detail plan view of the totalizer actuating means, and manner of automatically connecting any one of the totalizers for operation; Fig. 29 is an end view thereof; Fig. 30 is a diagrammatic face view of one form of sales tickets; Fig. 31 is a detail view of two of the totalizer disks; and Fig. 32 is a face view thereof, looking from the right.

Referring now to the drawings, particularly to Fig. 3, the numeral 1 indicates a casing, of any suitable design, within which I place the recording devices and coöperating mechanism comprising my invention. As has been stated, my invention is adapted to record the amount of a sale on an individual sales ticket. To carry out this purpose I provide the casing 1, with a slot 2 which communicates with a ticket receiver 3, which in turn is pivotally connected to the casing 1 as at 4. The heavy line 5 indicates a sales ticket, in position, in the receiver 3. To record, or print, upon the ticket 5, I position adjacent the lower end thereof, a plurality of disks 6, 7, 8, 9, 10 and 11 (see Fig. 7) said disks being loosely mounted upon a fixed bar 12, and provided with raised numerals or type 13, said numerals, on each disk, ranging in numerical order from 1 to 0. Each of the disks 6, 7, 8, 9, 10 and 11 is provided with a pinion 14 adapted to rotate said disks. To rotate the disks I have in this instance provided operating levers 15, the outer ends of which are pivotally mounted upon a bar 16, the inner ends being provided with a toothed segment 17 the teeth of which are adapted to mesh with the teeth of the pinions 14. To operate or depress, the levers 15, I have provided for each lever a plurality of stems 18 there being ten stems for each bar 15, having button heads 19, the said button heads being numbered from 1 to zero (0) as shown in Fig. 1. As there are, in this instance, six recording disks, I will, for the sake of clearness, and to facilitate the description of the operation of the cash-register to be hereinafter given, designate the six rows of stems 18 and the attached buttons 19 as A, B, C, D, E and F.

The rows A and B aid in recording cents and the rows C, D, E, and F dollars. The stroke of the stems 18 and their position upon the levers 15 is such as to provide a movement on the part of the disks 6 to 11 inclusive, sufficient to bring the character on the said disks, corresponding to the button pressed, in operative relationship with the ticket 5. In other words, when a button marked 1, for instance, is pressed the movement of the disk operated will be just enough to bring the numeral 1 in operative relationship with the ticket 5. A button marked 0 will, when pressed, rotate its disk once and the other buttons will rotate their respective disks proportionately. For the sake of clearness, I have marked the disk 6 (Fig. 3), on the side thereof, from 1 to zero (0). When the disks 6 to 11 are in their normal position the zero mark will be in position for recording, and it might be inferred that a button therefor is superfluous. The object of providing a button for the zero mark is to more completely carry out the sequence of recording a sale, as it is more natural, when recording a sale of one dollar to strike a button marked 1, in the dollar row, and two, in the cents columns or rows, marked zero (0) than to strike 1 only in the dollar row. Furthermore I have provided a visible checking device, that is to say, a device that will produce the amount of a sale in plain sight, such device comprising a plurality of disks, 20, 21, 22, 23, 24 and 25. The disks 20 to 25, inclusive, have upon their respective peripheries numerals to correspond to the type numerals 13 on the disks 6 to 11 inclusive. By means of a mechanism, to be hereinafter described, the disks 20 to 25 are rotated upon the rotatable shaft 28 to correspond to the rotation of the disks 6 to 11. Hence when any numeral 13 is brought to a position to print, a corresponding numeral will appear at the opening 27 in the case 1 (see Figs. 2, 4 and 6). This visible indication acts to check the amount of the sale; consequently when a dollar sale is to be recorded the amount of one dollar will appear in the form of 1 and two 0 characters (1.00). To carry out the function of recording, I prefer to hold each lever 15 down after having been depressed by any one of its buttons, and to keep it down until an impression has been taken from the type thereupon. To this end, I provide each lever 15 with a ratchet-rack 29, and mount upon the shaft 30, adjacent thereto, a resilient, or spring ratchet 31, each ratchet rack 29 having an individual ratchet 31 (see Fig. 7). The hubs 32 of the ratchets 31 are pinned, or otherwise secured, to the shaft 30, which is rotatably mounted in the side walls of the casing 1. A spring 33 (Fig. 7) keeps the shaft 30 from rotating when any ratchet 31 (or more than one at a time) is jumping the teeth of the rack 29. By means of the racks 29 and ratchets 31, I am able to hold down any particular lever 15 or a plurality of said levers, until the amount of a sale has been recorded. Should an error occur in the preparation of the mechanism for recording, the said error will be immediately indicated at the opening 27, by means of the numbered disks 20 to 25. The said error being detected, the mechanism can be restored to its normal position in the following manner: To restore the mechanism to its normal position, I mount upon the shaft 30 an arm 34 (see Figs. 3 and 7), said arm 34 being in contact with an arm 35 carried by a spindle 36 and operated by a lever 37 on the outside of the casing 1, the spindle 36 being rotatably mounted in the wall of the casing 1. When the lever 37 is pushed toward the back of the casing 1, the arm 34 will travel upwardly, thereby rotating the shaft 30 in a manner to carry the ratchets 31 away from the racks 29, thereby permitting the reaction of the springs 38 to force the levers 15 upwardly and restore the disks, controlled thereby, to their normal positions. When the mechanism has been correctly set, to record a sale, the device which causes an impression to be taken from the type on the disks will restore the levers and disks, after the impression has been taken, to their normal position in a manner to be hereinafter described.

Having described the method of setting the recording devices to record the amount of a sale on a sales ticket, I will describe the mechanism, which I have provided, to also record on the said sales ticket the character of a sale. To record the character of a sale, I have, in this instance, provided a disk 39, which I mount upon a sleeve 40, the said sleeve being mounted on the bar 12 (see Fig. 2) and capable of rotation thereupon, independently of the disks 6 to 11, inclusive. In this instance, I have positioned the disk 39, on the sleeve 40 adjacent to the disk 11. The disk 39 carries the words "Charge" "Cash" and the abbreviation "C. O. D.", in raised type. When the disk 39 is in the normal position the word "Cash" will be in printing relationship with the ticket 5. For the sake of clearness, the said words "Charge" and "C. O. D.," are printed adjacent their respective positions on the disk 39. Adjacent to the opening 41 (see Fig. 2) I place a disk 42 having upon the periphery thereof the words "Cash," "Charge" and "C. O. D" (Fig. 3 shows the position of the said words on the disk 42), the word "Cash" normally appearing at the opening. It may be here stated that in the event of cash sales being made, the sales character recording disk 39 will not be moved, and as cash sales are likely the most numerous, I prefer to have the "Cash" type normally in a position for recording upon the ticket 5, and to normally appear at the opening 41 in the case 1. For operating the disk 39, at the proper time, I mount upon the sleeve 40 a miter pinion 43 which meshes with a miter gear 44 carried by a rotatable shaft 45 suitably mounted on the wall 46 of the casing 1 (see Fig. 3). Upon the shaft 45 I mount a spur gear 47 having in mesh therewith the teeth of the rack portion 48 of an operating bar 49. The bar 49 carries, at the upper end thereof, a rack portion 50 adapted to mesh with a spur gear 51 on the rotatable shaft 28 (see Figs. 3 and 5). The disk 42 and spur gear 51 are both rigidly secured to the said shaft 28, the disks 20 to 25 inclusive being loosely mounted upon the said shaft and adapted for rotation thereupon. The operating bar 49 extends through the top of the casing 1 and has fixed to the end thereof a button 52, the said button being adjacent to the word "Charge" on the case 1 (see Fig. 1). The lower end of the bar 49 terminates in a rack 53 which in turn meshes with a spur gear 54 carried by the rotatable shaft 55. At the outer end of the shaft 55 I mount a belt wheel 56, which is adapted to wind up, or cast off, a belt 57 which in turn controls the transverse movement of a carriage 58, which is slidably mounted on the rods 59 (see Fig. 3). When the belt 57 is wound up the carriage 58 will be drawn to the left (Fig. 2), and when cast off the said carriage will be drawn to the right by a spring 60. When the button 52 is pressed downwardly the belt 57 will be wound up and draw the carriage 58 to the left. To allow the spring 60 to draw the carriage to the right I provide a rack 61, which meshes with the gear 51 on the shaft 28 (see Fig. 3). The rack 61 is formed upon an operating rod 62 having a push-button 63 on its upper end, as shown. When the rod 62 is pushed down, the belt 57 will be cast off and the spring 60 will draw the carriage 58 to the right. Adjacent to the rod 62, and on the top of the case 1, I place the abbreviation "C. O. D."

The purpose of the above described device will be hereinafter explained.

Upon the carriage 58 I mount a slide 64 (see Figs. 2 and 3), the said slide having a dove-tail strip 65 which is adapted to fit the dove-tail slot 69 in the side-members 70 of the carriage 58 (see Figs. 21, 22, 23 and 24). One end of the slide 64 is provided with eyes 71 adapted to receive a spindle 72, which in turn carries a record sheet roll 73 (see Fig. 3). The sheet 74 of which the roll 73 is formed, passes between the rolls 75, suitably mounted as shown, on the slide 64. From the rolls 75 the sheet 74 continues forward under the inking ribbons 76 and 77 and over the printing pads 78 and 79 adjacent thereto, thence between the feed roll 80 and presser-roll 81, the said presser-roll being mounted on the carriage 58 as shown in Fig. 3. The record sheet 74 is divided into three columns, as shown in Figs. 8 and 9, the center column having the word "Cash" at the head thereof, the right hand column the word "Charge" and the left hand column the abbreviation "C. O. D." When the carriage 58 is in its normal position, the record sheet 74, carried thereby, will be in a position to bring the cash column under the recording device 82 (which will hereinafter be described), the record sheet being fed through a slot 83 in the back wall of the case 1.

To take an impression from the recording device 82 I provide the vertically movable pad 79 (see Figs. 3 and 8), the said pad being slidably mounted in a guide-way 84 carried by the slide 64. Under the said pad I position, upon the rotatable shaft 85, a cam 86 (see Fig. 3), the said shaft being provided with an arm 87, to which is connected the lower end of a link 88, the upper end of said link being connected to an arm 89 carried by the rotatable shaft 90. The shaft 90 is provided with another arm 91, which, by means of a link 92, connects the rotatable shaft 93 with the shaft 90, the shaft 93 being provided with an arm 94, to which the lower end of the link 92 is connected. Upon the shaft 93, and back of the ticket receiver 3, I mount an arm 95 (see Fig. 9), which by means of the link 96, connects the said receiver 3 with the rotatable shaft 93. To cause an impression to be taken from the various recording disks, the lever 97 (Fig. 1) which is mounted on the outer end of the shaft 90, is pushed toward the back of the machine, whereby the cam 86 is caused, by the rotation of the shaft 85, to lift the pad 79, whereby the record sheet 74 is pressed upwardly against the type of the recording device 82, the inking ribbon 77 being between the said sheet 74 and the type of the recording device 82. While the pad 86 is moving upwardly, by the rotation of the shaft 90, the shaft 93 is being rotated through the agency of the arm 91, link 92 and arm 94, the rotation of the shaft 93 causing the ticket receiver to swing toward the disks adjacent thereto, whereby the ticket 5 is pressed against the type of said disks, and through the agency of the inking ribbon 98, an impression is taken therefrom.

In combination with the devices hereinbefore described for recording the amount of a sale, and the character of a sale, on the ticket 5, I have provided a device which is adapted to record the identifying character of the operator on the ticket, as well as a device adapted to record the identifying character of the operator on the record sheet 74. I will first describe the device which records the above named character on the ticket 5.

The device which I have provided for the purpose of recording the identifying character of an operator comprises a disk 99 (see Fig. 2) having upon the periphery thereof, in raised type, numerals ranging, in this instance from 1 to 7. (Figs. 14 to 19 may be consulted to render the description of this particular feature of my improvement clearer). In this instance I have mounted upon the shaft 12 a rotatable sleeve 100, upon one end of which, and adjacent to the disk 6, I mount the said disk 99. The shaft 12 does not extend the full length of the sleeve 100 as shown in Fig. 14, wherein a plug 101 is shown as extending for a short distance into the sleeve 100. The function of this plug will be hereinafter explained. The controlling element for the disk 99 is retained within a bushing 102, the body of which is passed through the wall 103$^a$ of the case 1, the bushing being held by screws, which pass through the flange of the bushing 102. Within the bushing 102 the body portion 103 of a ratchet 104, which in this instance is shown integral with the sleeve 100, is adapted to rotate, the said body portion 103 being provided with openings 105. To the front face of the body portion 103 I attach a plate 106 said plate being provided with (in this instance) seven openings 107, 108, 109, 110, 111, 112 and 113. Each of said openings will receive a certain key, for instance, the opening 108 will receive the barb 114 of the key 115 (see Fig. 17) and the opening 111 will receive the barb 116 of a key 117 (see Fig. 18). Each key has a square bore 118 into which the squared end 119 of the plug 101 will enter. It is obvious that the barb of the key 117 will not enter the opening 108, which will receive the barb of the key 115 only, nor will the barb of the key 115 enter the opening 107. Each of the seven keys, for which the openings 107 to 113 are designed, will have a barb adapted to fit one of the seven openings only.

While I have herein illustrated an identifying character recording device having seven characters it will be understood that any desired number of characters can be used. The object of this device is to record on the sales ticket the number or letter of the operator or clerk making the sale. It is usual for a clerk to place his or her number on the sales ticket for the purpose of identification should any disagreement arise concerning the sale. As a number of different clerks might at different times during the day, operate any one cash-register, I arrange the controlling mechanism for the identification should any disagreement arise the manner above mentioned, in other words, any one of a number of different operators can, by means of a certain key which he or she carries, turn the disk 99 to cause his or her identifying character to assume a position for recording on the sales ticket in the receiver 3. To prevent an operator from withdrawing the key, until his or her identifying character has been brought to a position for recording, I secure to the back of the ratchet wheel 104 a plate 120, to which I pivotally secure a plurality of latches 121, the catch of which extends into its adjacent opening 105 in the body 103 of the said ratchet wheel 104. There is a latch 121 for each of the seven openings in the plate 106. The latches 121 are backed by springs 122. The latches 121 are designed to snap into notches in the barbs of the keys, such, for instance, as the notches 123 in the barbs of the keys 115 and 117, when a key is inserted through its proper opening in the plate 106, and prevents the key from being withdrawn until the disk 99 has been rotated to the proper point for recording, such point being represented by the arrow-head 124 on the flange of the bushing 102, as shown in Fig. 15. To enable the key to be withdrawn, when it has reached the arrow-head 124, I have provided a bracket 125 having a cam portion 126, which, when the latch 121 that is at the time holding a key reaches the arrow-head, forces the outer end of the said latch 121 outwardly, or in a direction away from the sleeve 100, whereby the point of the latch is forced out of the notch 123 in the barb of the key, the key can then be withdrawn. As a further illustration, supposing an operator, whose identifying character is 5, is to go on duty, the key 117 in this event will be in possession of the said operator. When the operator goes on duty he or she inserts a key in the opening 111, which is indicated by the character 5, the bore 118 fitting over the squared end 119 of the plug 101. When the key has been pressed home the adjacent latch 121 will engage the notch 123; therefore the key cannot be withdrawn. It may here be stated that the disk 99 has upon the periphery thereof, in raised type, the numeral 5, the said numeral occupying the same angular position upon the said disk that the opening 111 does in the plate 106. After having inserted the key the operator turns the said key in the direction of the arrow 127 and continues to turn the key until his number (5) comes opposite to the arrow head 124. When the number has reached this last named position, the cam-face 126 will have forced the latch out of the notch 123, whereby the key can be withdrawn, if desired. The above described rotation of the ratchet 104 and disk 99 will cause the numeral 5 to assume a position for recording upon the ticket in the receiver 3, when a sale is made. Supposing, for the sake of illustration, the operator should be called away to go on duty elsewhere, and number 6 is to take the place of number 5. In this event number 6 inserts the number 6 key in the opening 112 (also marked 6) and turns the key as did number 5, which produces the result given above, viz., the numeral 6 will assume a position for recording on the ticket in the receiver 3. At this time, number 6 can withdraw the key, if desirable. After a space of time, should number 6 go off duty, and he or she is not to have a substitute, for instance at the close of business hours, the key is then again inserted in the opening 6, at the arrow-head 124, and turned in the same direction as before. After the key has left the arrow-head its adjacent latch 121 will again engage the notch in the barb of the key, whereby the key cannot be withdrawn until the 0 mark on the plate 106 comes opposite to the arrow-head, this being the normal position for the device. It now becomes necessary to release the key. To release the key (or any other key) I slidably mount upon the sleeve 100 a block 127' having a cam or angular surface 128. The block 127' is provided with a recess 129 which is adapted to allow the block to pass the bracket 125 when the said block is forced toward the ratchet 104. When the said block is forced toward the ratchet the angular surface 128 forces the outer ends of all the latches 121 outwardly, whereby, any key, which is at the time in position can be withdrawn. The block 127' is operated simultaneously with the printing pads and receiver in the following manner: Before describing the manner of operating the block 127', I will here state that the above described operator's identifying recording device is not intended to be proof against fraud, as any two operators could change keys, but whatever key is possessed by any one operator that key has to go in an opening therefor, and the number of that key will be the number recorded, consequently if operator 5 takes number 6 key, operator 6 will be answerable for mistakes actually made by operator 5. This in itself will tend to prevent frauds of this character. I will now describe the operative relationship existing between the printing device and the block 127'. To adapt the block 127' for longitudinal movement upon the sleeve 100, I provide the said block with studs 130, with which a fork 131 (see Figs. 9 and 10) is adapted to engage, the said fork being carried by one arm 132 of a shift-lever, the said shift-lever being attached as at 133, to a spindle 134, the said spindle being rotatably mounted in the brackets 135 and 136, as shown. To operate the said shift-lever I place upon the shaft 90, a cam-block 137 the cam portion 138 of which is adapted to impinge the roller 139 on the end of the arm 140. A spring 141 keeps the roller in contact with the cam block. When the shaft 90 is rotated to force the receiver 3 forwardly to print, the cam 138 will force the block 127' in the direction of the arrow 142, whereby the latches 121 are actuated to release a key, as has been stated.

The device above described is for the purpose of recording the operator's identifying character on the sales ticket, and will be hereinafter designated by G.

To control the recording of the operator's identifying character on the record sheet 74, I provide a device H which is the duplicate of the device G. The element 142 of the device H is rotatably mounted on the bar 143, which carries the recording device 82 (see Fig. 9). The disk 144 of the device H is controlled by the same keys as the device G. Upon the element 142 of the device H, I mount a block 144ª, the said block being operated by the lever 145 which is pivoted to a bracket 146. The spindle 134, at the lower end thereof, is provided with an arm 147 which is adapted to actuate the lever 145 to force the block 144ª inwardly to actuate the latches to release a key in the device H. The device H not only controls the positioning of an operator's identifying character, but also locks or unlocks the levers 15 in the following manner: By referring to Fig. 11 it will be seen that the element 142 of the device H has mounted thereupon a disk 148 having a cam spot 149 thereupon, which, when the device is in its normal position, holds, in a depressed position, the arm 150 of a lever 151 which is pivoted to the wall 103 of the case 1, as at 152. The arm 153 of said lever 151, at the end thereof, impinges upon, and forces upwardly, the arm 154 which controls the locking beam 155, said beam 155 and said arm 154 being secured to a rotatable shaft 156 (see Fig. 7). When the device H is in the normal position, that is when the machine is not in use, the cam 149 by means of the lever 151, keeps the beam 155 pressed against the backs of the ratchet pawls 31, which act to prevent the levers 15 from being depressed. When an operator inserts a key to record his or her number, or character, on the record sheet 74 the cam spot 149 is carried away from the end of the arm 150, of the lever 151, whereby the spring 157 will force the locking beam controlling arm 154 downwardly, thereby releasing the pawls 31.

From the foregoing description it will be seen that the device H is adapted for a double purpose, viz., to record the identifying character of the operator, who unlocks the machine, on the record sheet 74, also to lock or unlock the machine. When the operator goes off duty he manipulates the device H in the manner described for the device G to throw the recording disk 144 back to the 0 point. When the 0 point is reached the cam-block 149 will again actuate the lever 151 to cause the beam 155 to impinge upon the pawls 31. The disk 144 carries upon the periphery thereof numerals corresponding to the numerals on the disk 99 of the device G.

To record the amount of a sale on the record sheet 74, I utilize the device 82, hereinbefore mentioned, which is composed of six independently operated disks, 159, 160, 161, 162, 163 and 164, the said disks being loosely, rotatably mounted on the bar 143, which supports the sleeve 142 of the recording device H. Each of the disks above mentioned are provided on the periphery thereof, with raised numerals 13 on the disks 6 to 11, inclusive. A pinion 165 is secured to each of the disks 159 to 164 inclusive, said pinion being adapted to rotate its connected disk. The disks 6 to 11 inclusive, and the disks 159 to 164 inclusive, are adapted for a synchronous movement for the purpose of causing corresponding numerals to assume a printing relationship with a sales-ticket, in the receiver 3, and the record sheet 74. The disks 20 to 25 are caused to rotate in synchronism with the sales-ticket recording disks and the record sheet recording disks, in order to cause numerals, corresponding to the amount of a sale, to be recorded, to appear at the opening 27 in the case 1. The above mentioned synchronous movement of the three sets of disks is accomplished in the following manner: For the sake of simplicity, the visible indicating device comprising the disks 20 to 25 will be hereinafter designated by I. To actuate the sales-ticket recording device, the record sheet recording device and the visible indicating device I in synchronism, I provide each lever 15 with a rack 166 (see Figs. 3 and 4), each rack meshing with an independently rotatable idle gear 167 loosely mounted on a rod 168, each gear 167 being long enough to permit a rack 169 to mesh therewith, each rack 166 controlling an independent rack 169 (as shown in Fig. 4), the said two racks meshing with the same gear. The racks 169 are carried by slidable bars 170 which, at the end opposite to the said racks 169, are provided with other racks 171 (see Fig. 3). The said racks 171 mesh with two sets of idle gears, one set being immediately above the record sheet recording device 82, and comprises the independently rotatable gears 172 loosely mounted on the bar 173 (Fig. 8). The second set of gears is in line with, but back of, the gears 173, and comprises the independently rotatable gears 174 loosely mounted on the bar 175. The gears 174 have in mesh therewith (Figs. 3, 5 and 8) the racks 176 of the vertically movable rods 177. The upper end of each rod 177 is provided with a rack 178 adapted to mesh with a coöperating pinion 179 carried by each of the disks 20 to 25 inclusive of the indicating device I.

To operate the disks 159 to 164 of the record sheet recording device 82, I provide each idle gear 172 with a segmental rack 180', (Figs. 3 and 8), each rack 180 meshing with a coöperating pinion 165 on each of the disks of the recording device 82. When any one of the levers, or any number of levers, 15 is, or are depressed, to cause a certain character to assume a printing position in front of the sales ticket, the racks 166 will rotate their corresponding gears 167 and draw the bar 170 outwardly, whereby the gears 172 and 174 are likewise rotated, the racks 180' causing their corresponding disks of the recording device 82 to rotate and cause a character, corresponding to the character occupying the same angular position on the actuated sales-ticket recording disk, to assume a printing position with respect to the record sheet 74; at the same time a gear 174, which is controlled by the actuated bar 170, rotates and pulls its intermeshing rack 176 downwardly, whereby the disk of the indicating device I, which is controlled by the actuated rack 176, is rotated to cause the numeral selected, on the key-board, to appear at the opening 27. The proportions of the gears 168, 172, 174 and 179 will be such as to produce the above named result. After the disks have been set to record any number or numbers, the receiver 3 and pad 79 can be actuated, in a manner hereinbefore described, and cause an impression to be taken on the sales-ticket and record sheet. As has hereinbefore been stated, the levers 15 are locked, after having been depressed, in order to permit an impression to be taken from the type on the recording disks. After an impression has been taken, it becomes necessary to release the bars 15 and allow the mechanism to assume the normal position. The releasing is accomplished upon the return stroke of the printing mechanism in the following manner. To the shaft 85, I attach an arm 180 (Fig. 3), to which one end of a link 181 is attached, the other end thereof being attached to a pivotal arm 182, to the upper end of which I pivotally attach a dog 183, said dog being backed by a spring, as shown. To the shaft 30 I attach an arm 184, the lower end of which is tapered to match the tapered end of the dog 183. When the cam 86 is rotated to raise the pad 79, the arm 180 forces the pivotal arm 182 forward, whereby the dog 183 is knocked down and passes over the end of the arm 184 on the shaft 30. The spring under the dog 183 will force the dog upwardly again, as soon as it passes the end of the arm 184. Upon the return of the pivotal arm 182 the latch of the dog will catch the end of the arm 184 and rotate the shaft 30 to pull the pawls 31 out of the racks 29, whereby the levers 15 can return to their normal position. The back of the catch, on the end of the dog 183, has enough taper to allow it to jump the end of the arm 184, as soon as the arm 34 contacts the stop 185, whereby the arm 182 can return to its normal position. The printing device also forms the function of advancing the record sheet, one step, after each impression thereon in the following manner: Under the record sheet carriage 58, at the rear of the case 1, I position a rotatable shaft 186, and upon said shaft, adjacent each end thereof, I place an arm 187, said arms supporting a bar 188. Upon the bar 188 I slidably mount a pawl 189, which is adapted to engage a ratchet wheel 190 on the shaft 191, which carries the feed roll 80. To keep the pawl 189 in position, as well as to slide it along the bar 188 when the carriage 58 is shifted, I provide a jaw 191' (see Fig. 23) within which the said pawl is held, the said pawl being backed by a spring 192 (see Fig. 3). The upper end of the pawl is adapted to engage the teeth of the ratchet wheel 190. To operate the pawl, to actuate the ratchet wheel, I mount upon the shaft 186 an arm 193, which underlaps the arm 87. When the arm 87 is raised, during the operation of printing, the spring 194 under the arm 193 will force the said arm upwardly, whereby the pawl 192 is drawn downwardly, thereby advancing the record sheet one step. When the arm 87 returns, it forces the arm 193 down again, whereby the pawl will engage another tooth of the ratchet wheel 190. The advance movement of the record sheet will cease at about the time the record sheet comes in contact with the type of the recording device 82.

I will now describe another feature of my improved cash-register, which consists of an electrically operated tell-tale indicating device adapted to indicate when any particular operator is on duty, and to indicate when the machine is locked or unlocked. The said tell-tale is operated by the operator's character recording device H, in the following manner: Adjacent to the arm 150 of the lever 151, I place the contacts 195 and 196, the said contacts being caused to complete an electrical circuit through the wires 197 and 198 by the pawl 199 of the recording device H. The contact 195 is a resilient member acting as a spring for the pawl 199. The pawl 11 of the device H and the pawl 200 of the device G prevents the operator from rotating the recording devices in the wrong direction. The tell-tale indicator comprises a casing 201, having openings 202, 203 and 204. The opening 202 enables any one to see an operator's identifying character opposite thereto, and the openings 203 and 204 exhibit an arrow 205 which ponts to "Locked" or "Unlocked". Within the casing, I mount a rotatable disk 206 having thereupon characters to correspond to the characters on the disks 99 and 144 of the recording devices G and H, respectively. The disk 206 carries a ratchet-wheel 207 which has in engagement therewith the pawl 208 of a magnetically actuated arm 209. Upon the periphery of the disk 206, I place a cam-knob 210 which is adapted to actuate the pivotal lever 211, which in turn operates the pivoted arrow 205. To actuate the arm 209 I provide a magnet 212, said magnet being in circuit with the contacts 195 and 196 through the wires 197 and 198 and the source of energy 213. The position of the disk 206 and arrow 205 indicates that the machine is not working. As soon as an operator manipulates, with a key, the device H, the number of the operator will appear at the opening 202, for the reason that as the ratchet of the said device rotates, the pawl 199 will jump the teeth of the said ratchet, and at every jump will cause the contacts 195 and 196 to come together and complete the circuit for the magnet 212, whereby the disk 206 is rotated the same extent as the disk 144 of the recording device H. As soon as the disk 206 commences to rotate, the cam 210 will leave the lever 211 and the spring 214 will pull the arrow 205 over to "Unlocked". The unlocking of the machine has been previously explained.

In combination with the recording devices for recording the amount of a sale on the ticket and record sheet the device for recording the character of a sale, and the device for recording the identifying character of an operator, I employ a device which is adapted to record, on the record sheet, the time of a sale, or the time that an operator unlocks the machine for operation or locks the said machine. The time recording device comprises the ring 215 and disk 216 (see Figs. 9, 25, 26 and 27). The ring 215 is numbered in hours and the disk 216 is numbered in minutes. The disk 216 is loosely mounted on the rod 143 and free to rotate thereupon. As can be seen in Fig. 9, the said disk and ring are mounted between the recording device 82 and the operator's identifying character recording disk 144. To the rod 143, and adjacent the disk 216 I fasten a plate 217 (see Figs. 26 and 27), upon which is rotatably mounted an idle gear 218, which meshes with an idle pinion 219 also rotatably mounted on said plate. The pinion 219 meshes with the internal teeth 220 of the ring 215, the ring 215 being rotatably mounted on the plate 217. The disk 216 carries a bushing 221 to which an arm 222 is secured, said arm being provided at its outer end with a tooth 223, adapted to engage a small gear 224 carried by the idle gear 218.
When the minute disk 216 has been rotated to the extent of 59 minutes, the tooth 223 will engage the gear 224 and during the rotation of the disk 216 during the next minute, to complete the hour, the gear 218 and pinion 219 will cause the ring 215 to advance one division, which represents one hour. When the hour has been brought into position the tooth 223 will leave the gear 224 and continue around free, for another 59 minutes, at the completion of which another hour will be brought into position. The disk 216 has attached thereto a spur gear 225, with which a pinion 226 meshes (see Figs. 2 and 8), the pinion 226 being carried by a sleeve 227 loosely mounted on the rod 175, the said sleeve being also provided with a bevel pinion 228 adapted to mesh with a bevel gear 229 carried by the upright shaft 230. The said shaft is suitably rotatably mounted in brackets as shown. The upper end of the shaft 230 carries a bevel gear 231 having in mesh therewith a bevel gear 232, which in turn is carried by the minute hand spindle of a suitable clock movement.
The operation of the above described time recording mechanism is quite obvious, but to render the operation clearer, I will state that the minute disk 216, upon which numerals from 1 to 60 (indicated by 0) are placed in raised type, is kept constantly rotating by the minute hand spindle of the clock, that is to say, the said disk rotates once in every hour, but one minute before the completion of said revolution the operating mechanism of the ring 215 is engaged, and when the full rotation of the disk 216 has been accomplished, the ring 215 will have advanced to the extent of one hour. When the recording devices for recording a sale have been set, and an impression has been taken therefrom, the time of the impression will appear alongside of the sale on the record sheet, as the impression, or printing pad, 79 will cause the record sheet 74 to go up against the inking ribbon 77, which in turn will strike the raised type on the ring 215 and disk 216. When an operator turns the disk 144, in a manner hereinbefore described to bring his or her number in position for recording, the printing mechanism is operated and the time recorded. At the same time, in a similar manner, the operator unlocks the machine and sets his or her identifying character for recording on the sales ticket 5 by means of the mechanism G. Therefore, the time at which the machine is unlocked is recorded. When the disks 99 and 144 are turned back to 0, to unlock the machine, the printing mechanism is again operated and the time thereof recorded. It is of course understood that the rules of the establishment using the machine will require the aforesaid operation.

I will now describe the device for totalizing the amount of the sales made, whether they be cash, cash-on-delivery or charge sales.

Referring to Figs. 2 and 3, especially Fig. 2, it will be seen that, adjacent to the record sheet 74 and the recording device 82 (Fig. 3) I have in this instance positioned three totalizing mechanisms or devices each being adapted for independent operation; the center totalizer being adjacent to the cash column of the record sheet 74; the totalizer L being adjacent the cash-on-delivery column, and the totalizer K adjacent the charge column (see Fig. 2). For a detailed description of the said totalizers, I will refer to the enlarged detail views thereof shown in Figs. 28, 29, 30 and 32. Figs. 2 and 3 fully illustrate the positions thereof. The totalizers J, K and L are each composed of the disks 233, 234, 235, 236, 237 and 238, all of said disks carrying raised numerals, on the periphery thereof, ranging from 1 to 0. Each of the disks 233 to 238 in each totalizer has attached thereto a ratchet wheel 239. Each disk and attached ratchet-wheel is loosely rotatably mounted on a rod 240 supported by a bracket 241, which in turn is carried by the carriage 58 (see Fig. 3). Each ratchet-wheel 239 is engaged by a ratchet-rack 242 pivoted to a reciprocatable slide 243, as at 244. The slides 243 are dove-tailed into the bracket 241, as at 245 (Fig. 29). The slides 243 are each provided with a jaw 246 adapted to receive the end of a nib 247, which depends from each bar 170 (see Fig. 3, in which one only is seen). Between the slides 243 of the totalizer I provide a jaw 248 adapted to keep the nibs 247 in alinement while the carriage 58 is being shifted. Each of the disks excepting the end disks 238, of the totalizers, are counterbored, as at 249 (Figs. 31 and 32), and within the said counterbores and secured to the rod 240 I place a plate 250, to which I secure a cam-block 251. Each ratchet-wheel 239 is provided with an arm 252 to which is pivotally secured a pawl 253. The pawl 253 carries a resilient arm 254 to which is secured a pin 255. In the periphery of the counterbore 249 I cut a recess 256, into which the pawl 253 is forced by the cam-block 251 at the proper time. By reason of the ratchet-wheels 239 and ratchet-racks 242, the disks of the totalizers are rotated in one direction only, and each disk is adapted to be rotated independently of the other disks; at the same time, any of the disks can operate its adjacent disk one step, at the proper time, through the agency of the cam-block 251 and pawl 253, which will hereinafter be explained.

The operation of the totalizers will now be explained, but it may here be stated that all three totalizers are operated by the rods 170 through the agency of the depending nibs 247.

When the carriage 58 is in its normal position, the said position being shown in Fig. 8, and the totalizer J over the cash column, each of the nibs 247 will be in engagement with the jaws 246 of the totalizer J. When any lever 15 is depressed to set a figure in printing position with respect to the ticket 5, (take the lever 15 of the row C, for instance, and the button 19 having the numeral 2 thereupon,) the said lever 15 of the row C being the third from the right, a corresponding disk in the recording device 82, and a corresponding disk in the visible indicating device I will be rotated to bring the numeral 2 in the proper position, through the agency of a corresponding transmission gear 167 and a corresponding rod 170. As the rod 170 is drawn outwardly by the rotation of the said gear 167, the nib 247 on the said rod 170, will draw the engaged slide 243, and rack 242 carried thereby, outwardly, whereby the corresponding disk 234 will be rotated toward the left (Fig. 3), thereby bringing the numeral 2 over the ribbon 76. After an impression has been taken and the lever released, in a manner hereinbefore described, its spring 38 will force it upwardly, thereby causing the rod 170 to go back, likewise the slide 243 and rack 242. As the lever goes up and the rod 170 and rack 242 goes back, the disk of the recording device 82 and the disk 22 of the indicating device I will return to 0. The disk 234 of the totalizing device J will remain where previously set, as the rack 242 will jump the teeth of the ratchet-wheel 239, thereby leaving the numeral 2 over the inking ribbon adjacent thereto. If the button 4 should be pressed, the disks of the recording devices and visible indicating device I controlled by the pressed button, taking the same lever as above, would be rotated to bring the numeral 4 thereon into position; the disk of the totalizer J will also rotate 4 points, but the said 4 points would bring the numeral 6 into position, indicating that a sale of six dollars had been made. If, however, on the same lever the button 7 should be pressed, the numeral 7 on all the coacting disks would be brought into position. The said numeral 7, would, however, be added to the 6 on the totalizing disk 234 already in position, making 13. As the highest numeral on the disks of the totalizers is 10 or 0, 13 cannot be recorded on one disk. Hence, I provide the cam-block 251, pawl 253 and recess 256, which operate as follows: As can be seen in Fig. 32, the recess 256 is opposite the 0 mark and the cam-block 251 so positioned as to cause the pawl 253 to be forced into the said recess when the pin 255 on the resilient arm 254 strikes the said cam-block. The disk 234 will rotate freely from the 6 point to the 9 point at which time the pin 255 will strike the cam-block 251 and cause the pawl 253 to enter the recess 256. From the 9 to the 0 point the disks 234 and 235 will rotate together, thereby bringing the 0 point on the disk 234 and the 1 point on the 235 into position. The pin 255 will now leave the cam-block, whereby the disk 235 will remain stationary, but the disk 234 will continue for three more points and then stop, whereby 13 is in position for printing, indicating a sale of thirteen dollars. Supposing, for instance, I subsequently make a sale of twenty dollars. I press the 0 button on the lever in the C column, which causes all the recording disks to revolve once, whereby the 0 mark is placed in position, and the disk 234 is revolved once, whereby the numeral 3, already set, again takes its former position, I then press the 2 button in the D row, whereby the disks, actuated thereby, revolve to bring the said numeral in position, and the disk 235 is advanced 2 points. As I was already in position, 2 more points would make 3, making a total of 33 on the two totalizing disks. It is thought that the above description makes the operation of the totalizers clear.

The foregoing description refers to a cash sale. Supposing now I make a charge sale. I press the charge button (52) on top of the machine, whereby the carriage 58 is drawn, in a manner hereinbefore described, to the left (see Fig. 9). This movement on the part of the push-button 52 rotates the disks 42 and 39 to the charge position, and also brings the totalizer K under the levers 15. The nibs 247 on the rods 170 in this instance will slide out of the jaws 246 of the totalizing device J into the similar jaws of the device K. The carriage 58 is pulled against the tension of the spring 60. I hold the charge button down until after the manipulation necessary to record the sale, by setting the disks hereinbefore referred to and operating the printing mechanism. To record a cash-on-delivery sale, I press the button 63, thereby allowing the reaction of the spring 60 to draw the carriage to the right and thereby bring the totalizing device L in position for operation by the nibs 247. A record can be taken at any time, from any of the totalizers by forcing the lever 257 backwardly, whereby the pad 78 is forced upwardly. To record the said sales, I shift the carriage to bring the pad 78 under the proper totalizer. Stops 259 and 260 are provided to limit the sidewise movement of the carriage 58. The spring 60 will be so adjusted as to prevent it from moving the carriage unless the button 63 is pressed.

To place a new record sheet roll in position I pull out the slide 64, on the carriage 58, through the opening in the front of the case, which is normally kept closed by the door 258 (Fig. 3). After setting a new roll in place, I then replace the slide in the carriage.

Owing to the multiplicity of numerals and complication of parts, corresponding parts have not been numbered in all the views. As the drawings are thought to fully illustrate the construction of my improved cash-register, a detail description thereof has not been given, as to minor mechanical details.

Having now described my invention, what I claim and desire to secure by Letters Patent is:

1. In a cash-register, a ticket receiving device, a printing device comprising a plurality of independently operated numbered disks, each of said disks being provided with a gear-wheel, an operating lever for each of said disks provided with a toothed segment adapted to engage the gears on said disks, an auxiliary toothed segment carried by each of said levers, idle gears operated by each of said auxiliary segments, a printing device adapted to record on a record sheet, comprising a plurality of independently operated numbered disks, and means connecting said idle gears and the numbered disks of the printing device last named.

2. In a cash-register, a ticket receiving device, a printing device, comprising a plurality of independently operated numbered disks, each of said disks being provided with a gear-wheel, an operating lever for each of said disks, provided with a toothed segment adapted to engage the gears on said disks, an auxiliary toothed segment carried by each of said levers, idle gears operated by each of said auxiliary segments, a printing device adapted to record on a record sheet, comprising a plurality of independently operated numbered disks, means connecting said idle gears and the numbered disks of the printing device last named, a totalizing device, and means actuated by said operating levers adapted to operate said totalizing device.

3. In a cash-register, a ticket receiving device, a printing device, comprising a plurality of independently operated numbered disks, each of said disks being provided with a gear-wheel, an operating lever for each of said disks provided with a toothed segment adapted to engage the gears on said disks, an auxiliary toothed segment carried by each of said levers, idle gears, operated by each of said auxiliary segments, a printing device, adapted to record on a record sheet, comprising a plurality of independently operated numbered disks, means connecting said idle gears and the numbered disks of the printing device last named, and means adapted to record the identifying character of an operator.

4. In a cash-register, a ticket receiving device, a printing device, comprising a plurality of independently operated numbered disks, each of said disks being provided with a gear-wheel, an operating lever for each of said disks provided with a toothed segment adapted to engage the gears on said disks, an auxiliary toothed segment carried by each of said levers, idle gears operated by each of said auxiliary segments, a printing device adapted to record on a record sheet, comprising a plurality of independently operated numbered disks, means connecting said idle gears and the numbered disks of the printing device last named, and means adapted to record the identifying character of an operator, together with means adapted to record the time of a sale.

5. In a cash-register, a ticket receiving device, a printing device comprising a plurality of independently operated numbered disks, each of said disks being provided with a gear-wheel, an operating lever for each of said disks, provided with a toothed segment adapted to engage the gears on said disks, an auxiliary toothed segment carried by each of said levers, idle gears operated by each of said auxiliary segments, a printing device, adapted to record on a shiftable record sheet having a cash, cash-on-delivery and a charge column, comprising a plurality of independently operated numbered disks, means connecting said idle gears and the numbered disks of the printing device last named, and means adapted to shift said record sheet to bring the column corresponding to the character of the sale made, under the printing device last named.

6. In a cash-register, a ticket receiving device, a printing device comprising a plurality of independently operated numbered disks, each of said disks being provided with a gear-wheel, an operating lever for each of said disks, provided with a toothed segment adapted to engage the gears on said disks, an auxiliary toothed segment carried by each of said levers, idle gears operated by each of said auxiliary segments, a printing device, adapted to record on a shiftable record sheet having a cash, cash-on-delivery and a charge column, comprising a plurality of independently operated numbered disks, means connecting said idle gears and the numbered disks of the printing device last named, and means adapted to shift said record sheet, to bring the column corresponding to the character of the sale made, under the printing device last named, together with means adapted to register the time of a sale.

7. In a cash-register, comprising a plurality of recording devices, means adapted to lock said recording devices against operation, a controlling device for said locking device, means carried by an operator, adapted to unlock said locking device, when inserted, and to cause said locking device to lock, and an electrically operated auxiliary means adapted to indicate when the recording devices are locked or unlocked.

8. In combination with the recording devices of a cash-register, an operator's identifying character recording device, comprising a rotatable disk, having characters thereupon, means adapted to rotate said disk to bring any of the characters thereupon to a predetermined recording point, said means comprising a rotatable ratchet, provided with a plurality of openings of different shapes, a key for each of said openings and a pawl adapted to prevent the said ratchet from being turned backward.

9. In combination with the recording devices of a cash-register, an operator's identifying character recording device, comprising a rotatable disk having characters thereupon, means adapted to rotate said disk to bring any of the characters thereupon to a predetermined recording point, said means comprising a rotatable ratchet provided with a plurality of openings of different shapes, a key for each of said openings, means adapted to lock said key against withdrawal after said key has been inserted, means adapted to release said key-locking means at a predetermined point, and a pawl adapted to prevent the said ratchet from being turned backward.

10. In combination with the recording devices of a cash-register, an operator's identifying character recording device, comprising a rotatable disk, having characters thereupon, means adapted to rotate said disk to bring any of the characters thereupon to a predetermined recording point, said means comprising a rotatable ratchet provided with a plurality of openings of different shapes, a key for each of said openings, a latch adjacent each of said openings adapted to engage a key, after the insertion thereof and prevent the premature withdrawal thereof, means adapted to actuate said latch to free the key engaged thereby at a predetermined point, and a pawl adapted to prevent the said ratchet from being turned backward.

11. In a cash-register, a ticket receiving means, a device adapted to record the amount of a sale on a ticket, means adapted to record on a record sheet the amount of a sale, means adapted to operate said devices, an operator's identifying character recording device adjacent the ticket and record sheet, means adapted to actuate said identifying character recording devices independently, said means comprising a body having a plurality of openings, each of said openings being adapted to receive a certain key, means adapted to lock a key against withdrawal after said key has been inserted, and means adapted to release said key at a predetermined point of the movement of said identifying character recording devices.

12. In a cash-register, a sales ticket receiving means, a recording device adjacent thereto, means adapted to actuate same, a device adapted to record on a record sheet, a totalizer, means adapted to cause an impression to be taken from said recording devices simultaneously, means adapted to take an impression from said totalizer independently of the other of said impression means, transmission means adapted to transmit movement from the actuating means of the recording device first named to the recording device last named, and means actuated by said transmission means adapted to actuate said totalizer.

13. In a cash-register, a ticket receiving means, a recording device adapted to record the amount of a sale on a ticket, actuating means for said recording device, a shiftable carriage, provided with a record sheet having a cash, a C. O. D. and a charge column thereupon, means adapted to shift said carriage to bring the column corresponding to the sale made under the recording device therefor, a totalizer for each of said columns carried by said carriage, actuating means carried by each of said totalizers, a recording device adapted to record the amount of a sale in any of the columns on said record sheet, transmission means adapted to transmit movement from the recording device actuating means first named to the recording device last named, said transmission means being adapted to engage the actuating means of the totalizers adjacent to the column brought under the recording device therefor.

14. In a cash-register, a ticket receiving means, means adapted to record the character of a sale on a ticket, means adapted to record the identifying character of an operator on said ticket, a plurality of independently operated recording disks, adapted to record the amount of a sale on said ticket, a lever for each of said disks adapted to operate same, each of said levers being adapted for operation by a plurality of independent push buttons, a locking means adapted to lock any of said levers after said levers have been depressed, a printing mechanism adapted to cause an impression to be taken from said disks, said printing mechanism being adapted to release said levers after an impression has been made, and means adapted to record the time of an impression, a recording device adapted to record the amount of a sale on a record sheet, having a cash, a cash-on-delivery and a charge column, and a totalizer for each of said columns.

15. In a cash-register, a ticket receiving means, means adapted to record the character of a sale on a ticket, means adapted to record the identifying character of an operator on said ticket, a plurality of independently operated recording disks adapted to record the amount of a sale on said ticket, a lever for each of said disks adapted to operate same, each of said levers being adapted for operation by a plurality of independent push buttons, a locking means adapted to lock any of said levers after said levers have been depressed, a printing mechanism adapted to cause an impression to be taken from said disks, said printing mechanism being adapted to release said levers after an impression has been made, and means adapted to record the time of an impression, a recording device adapted to record the amount of a sale on a record sheet, having a cash, a cash-on-delivery and a charge column, and a totalizer for each of said columns.

16. In a cash-register, in combination with a sales recording means, a movable carriage provided with a record sheet, having thereupon, a cash, a cash-on-delivery, and a charge column, a ticket receiving means adjacent said sales recording means, a device adjacent said ticket receiving means, having thereupon characters adapted to record a cash, a cash-on-delivery and a charge sale, a totalizer for each of said columns on said record sheet, and means adapted to operate said record sheet carrying carriage and the device adjacent said ticket receiving means simultaneously to correspond to the character of the sale made.

17. In a cash-register, a sales ticket receiving means, a sales recording device, actuating means for said recording device, a charge and a cash-on-delivery push button, a device adapted to record on a sales ticket the character of a sale, controlled by said push button, a slidably mounted cash-on-delivery and charge totalizer, and means controlled by said buttons, adapted to move said totalizers to a position for operation by the sales ticket recording device actuating means.

18. In a cash-register, in combination with the recording devices thereof, a locking device for said recording devices, an auxiliary device adapted to indicate when said recording devices are locked, or unlocked, and a rotatable element carried by said cash-register, adapted to control said locking device and said indicating device.

19. In a cash-register, in combination with the recording devices thereof, a locking device for said recording devices, an auxiliary device adapted to indicate when said recording devices are locked or unlocked, a rotatable element carried by said cash-register, adapted to control said locking device and said indicating device, and an operator's identifying character recording device also operated by said rotatable element.

20. In a cash-register, in combination with the recording devices thereof, a plurality of independent rotatable elements, an operator's identifying character recording device controlled by each of said elements, a locking device for said recording devices, and means actuated by one of said rotatable elements adapted to control the locking device for said recording devices.

21. In a cash-register, in combination with the recording devices therefor, a plurality of independent rotatable elements adapted to receive a key, an operator's identifying character recording device, controlled by said rotatable elements, means adapted to secure a key when inserted in said elements, a printing device adapted to coöperate with said recording devices, and means operated by said printing device adapted to release a key in said rotatable elements.

Signed at New York city, N. Y., this 27th day of May 1908.

ISIDOR FLUEGELMAN.

Witnesses:
EDWARD A. JARVIS,
MILDRED VIALLS.